(12) United States Patent
Johns et al.

(10) Patent No.: US 10,097,451 B2
(45) Date of Patent: Oct. 9, 2018

(54) DYNAMICALLY OPTIMIZING CONTENT DELIVERY USING MANIFEST CHUNKING

(71) Applicant: LEVEL 3 COMMUNICATIONS, LLC, Broomfield, CO (US)

(72) Inventors: Kevin Christopher Johns, Erie, CO (US); Shane Amante, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/456,424

(22) Filed: Mar. 10, 2017

(65) Prior Publication Data
US 2017/0187611 A1    Jun. 29, 2017

Related U.S. Application Data

(60) Division of application No. 14/095,495, filed on Dec. 3, 2013, now Pat. No. 9,596,170, which is a
(Continued)

(51) Int. Cl.
*H04L 12/725* (2013.01)
*H04L 12/707* (2013.01)
*H04L 12/703* (2013.01)
*H04W 40/36* (2009.01)
*H04L 29/06* (2006.01)
(Continued)

(52) U.S. Cl.
CPC ............ *H04L 45/302* (2013.01); *H04L 45/14* (2013.01); *H04L 45/22* (2013.01); *H04L 45/28* (2013.01); *H04L 65/4084* (2013.01); *H04L 65/4092* (2013.01); *H04L 65/602* (2013.01);
(Continued)

(58) Field of Classification Search
None
See application file for complete search history.

(56) References Cited

U.S. PATENT DOCUMENTS 6,654,361 B1    11/2003  Dommety
7,299,291 B1 *  11/2007  Shaw ................. H04L 65/4069
                                                      709/203
(Continued)

FOREIGN PATENT DOCUMENTS

WO    WO-2012107788          8/2012
WO    WO-2012168356 A1      12/2012

OTHER PUBLICATIONS

Extended European Search Report, dated Oct. 12, 2016, Application No. 14773756.3, filed Mar. 13, 2014; 7 pgs.
(Continued)

*Primary Examiner* — Thomas J Dailey

(57) ABSTRACT

Implementations described and claimed herein provide a system and methods for dynamic re-localization and manifest chunking in a content delivery network. In one implementation, one or more stimuli corresponding to a connection to deliver content from a content source over a network to a user device along a network path are detected. The one or more stimuli indicate a connection issue. An optimized network path through which to deliver the content to the user device is determined based on current network conditions. The optimized network path responds to the connection issue. The user device is dynamically rerouted to the optimized path while providing a substantially continuous delivery of content to the user device.

20 Claims, 9 Drawing Sheets

Related U.S. Application Data continuation-in-part of application No. 13/828,251, filed on Mar. 14, 2013, now Pat. No. 9,509,784.

(51) Int. Cl.
   *H04L 12/721* (2013.01)
   *H04W 40/12* (2009.01)

(52) U.S. Cl.
   CPC ............ *H04L 65/80* (2013.01); *H04W 40/36* (2013.01); *H04W 40/12* (2013.01)

(56) References Cited

U.S. PATENT DOCUMENTS

| | | | |
|---|---|---|---|
| 7,761,900 B2* | 7/2010 | Crayford | H04N 7/17318 709/223 |
| 8,341,255 B2* | 12/2012 | Gopalakrishnan | H04L 65/4084 709/200 |
| 8,495,675 B1 | 7/2013 | Philpott et al. | |
| 8,532,070 B2 | 9/2013 | Pandian | |
| 8,959,067 B1 | 2/2015 | Patiejunas | |
| 9,332,051 B2* | 5/2016 | Brueck | H04L 65/607 |
| 9,660,922 B2* | 5/2017 | Ramakrishnan | H04L 47/25 |
| 2005/0021694 A1 | 1/2005 | Yuan | |
| 2006/0291504 A1 | 12/2006 | Cohn | |
| 2008/0151746 A1 | 6/2008 | Vasseur | |
| 2009/0279436 A1* | 11/2009 | Chin | H04L 45/00 370/237 |
| 2011/0055316 A1 | 3/2011 | Van der Merwe et al. | |
| 2011/0082924 A1 | 4/2011 | Gopalakrishnan | |
| 2011/0314130 A1 | 12/2011 | Strasman | |
| 2012/0233228 A1 | 9/2012 | Barton | |
| 2012/0317305 A1* | 12/2012 | Einarsson | H04L 65/4084 709/231 |
| 2013/0198328 A1 | 8/2013 | Green et al. | |
| 2014/0074961 A1 | 3/2014 | Liu et al. | |
| 2014/0089465 A1 | 3/2014 | van Brandenburg | |
| 2014/0215018 A1 | 7/2014 | Lam | |
| 2014/0280746 A1 | 9/2014 | Johns | |
| 2014/0280906 A1 | 9/2014 | Johns et al. | |
| 2015/0381678 A1 | 12/2015 | Fullagar | |

OTHER PUBLICATIONS

International Preliminary Report on Patentability, dated Sep. 15, 2015, Int'l Appl. No. PCT/US14/026050, Int'l Filing Date Mar. 13, 2014; 11 pgs.

International Search Report, dated Oct. 1, 2014, Int'l Appl. No. PCT/US14/026050, Int'l Filing Date Mar. 13, 2014; 6 pgs.

Written Opinion of the International Searching Authority, dated Oct. 1, 2014, Int'l Appl. No. PCT/US14/026050, Int'l Filing Date Mar. 13, 2014; 9 pgs.

\* cited by examiner

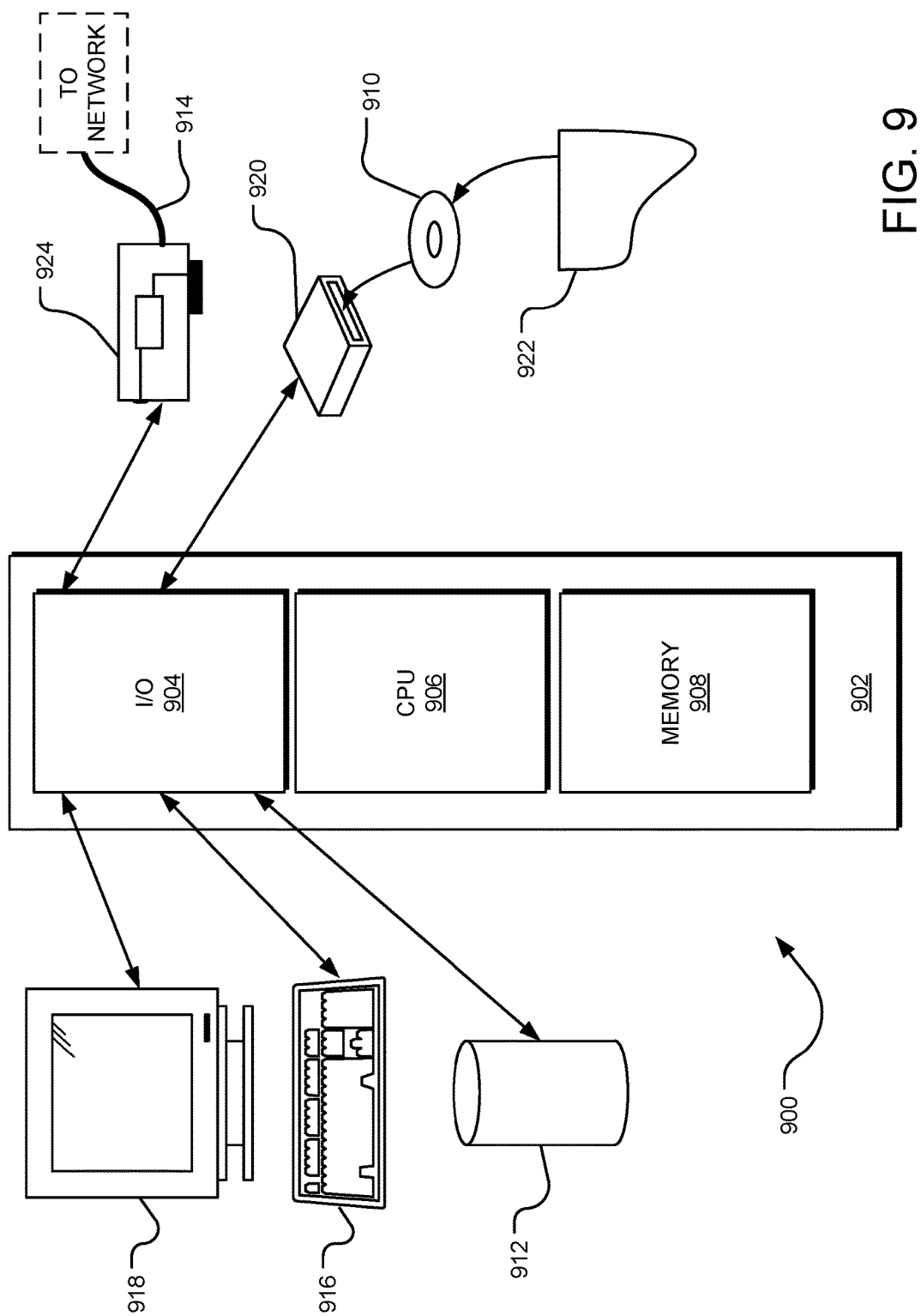

DYNAMICALLY OPTIMIZING CONTENT DELIVERY USING MANIFEST CHUNKING

CROSS-REFERENCE TO RELATED APPLICATIONS

This application is a divisional of and claims priority to U.S. patent application Ser. No. 14/095,495, entitled "Dynamically Optimizing Content Delivery Using Manifest Chunking" and filed on Dec. 3, 2013, which is incorporated by reference in its entirely herein for all purposes. Application Ser. No. 14/095,495 is a continuation-in-part of and claims priority to U.S. patent application Ser. No. 13/828,251, entitled "Manifest Chunking in Content Delivery in a Network" and filed on Mar. 14, 2013, which is incorporated by reference in its entirety herein for all purposes.

TECHNICAL FIELD

Aspects of the present disclosure relate to content distribution and delivery in a network, and more particularly to dynamic re-localization and manifest chunking in a content delivery network.

BACKGROUND

Networks, such as Content Delivery Networks (CDN), are increasingly used to distribute content, such as videos, multimedia, images, audio files, documents, software, data files, patches, and other electronic resources, to end users on behalf of one or more content providers. Using a CDN allows the content providers to increase the speed and reliability of content delivery without deploying additional infrastructure. Moreover, the end users obtain the content with fewer delays. However, many CDNs are generally not configured to efficiently deliver content while adapting to changes in the network.

For example, many CDNs are generally not configured to efficiently deliver content in a mobile environment, particularly as a user changes locations or networks while consuming the content. In the past, users tended to consume higher quality, larger sized content (e.g., a movie) primarily via a wired access network. In general, user devices are configured to prefer using the wired network over a wireless network, such as a cellular network, a WiMAX network, a WiFi network, or the like, where available, for data exchange because many wireless networks cannot handle data exchange as quickly or reliably as wired networks. However, as portable user devices, such as phones and tablets, have become capable of consuming higher quality content, users have come to expect content to be readily available outside of wired access networks.

Many CDN infrastructures include an access network, such as an Internet Service Provider (ISP), having a CDN component that delivers content to a user device. However, users may change location or networks while consuming the content. For example, a user may begin watching a video using a wired access network (e.g., via a residential ISP) and disconnect from the access network while continuing to watch the video. In doing so, the user device may become connected to a wireless network, such as a cellular network. Because the user began watching the video via the access network, the session is pinned to a server in the CDN based on the location and network policies of the access network, which may no longer be the optimal server from which to serve the content due to the network change.

Stated differently, to begin consuming on-demand and live video, audio, or other streaming media, the user device fetches a manifest file, which generally includes a uniform resource locator (URL) or a sequence of uniform resource identifiers (URIs) that identify the locations of consecutive segmented media files of the stream. The server from which the segments are served is determined based on the location of the user device using various policies implemented by the CDN. If the user device retrieves the manifest file using the access network, the server from which the segments are served is determined based, at least in part, on the location of the access network.

The user device downloads the segmented media files identified in the manifest file and presents the stream to the user. Because the user device is in the process of presenting the stream to the user, when the user disconnects from the access network and connects to another network, such as the wireless network, the user device does not re-fetch the manifest file. Accordingly, even though the user has changed attachment points to the CDN (i.e., from the access network to the wireless network), the CDN continues to direct the user device to retrieve the media segments from the original server designated based on the location of the access network, which may no longer be the optimal location from which to respond to requests from the user device.

Similarly, over the lifetime of the connection of the user device to the network to retrieve and present content, the conditions of the network may change, thereby impacting the quality of the connection and the user's satisfaction with the delivery and presentation of the content. For example, one or more routers or switches may fail in the network leading to suboptimal quality of the connection. Stated differently, many CDNs include several content servers from which the content can be supplied to a user device. To reduce network usage and performance, a CDN typically will attempt to provide the content from a content server that is separated by as little network infrastructure as possible from the user device, with particular emphasis on low latency. The session is pinned to the selected content server in the CDN along a network path. However, even if the network conditions change such that the delivery of the content from the selected content server over the network path is suboptimal, the CDN generally continues to serve the content from the selected content server to the user device over the network path. Accordingly, CDNs typically fail to adapt to changes in the performance of the network and/or attachment point of the user device to the network during the delivery of content.

It is with these observations in mind, among others, that various aspects of the present disclosure were conceived and developed.

SUMMARY

Implementations described and claimed herein address the foregoing problems, among others, by serving a manifest file as a series of subsets, thereby permitting a content delivery network to dynamically reroute requests for content segments based on changing locations or networks, changing network conditions, or the like. In one implementation, a request for content is received from a user device. A first manifest subset is provided using a network component in response to the request for content. The first manifest subset identifies a first set of one or more content segments and a second manifest subset. The first set of one or more content segments constitute a portion of the content, and the second manifest subset is identified at a tail of the first manifest subset. The first set of one or more content segments is served in response to separate requests. A request for the second manifest subset is received. The second manifest subset identifies a second set of one or more content segments.

Other implementations described and claimed herein address the foregoing problems, among others, by replacing a relative identifier with an absolute identifier to correct localization errors. In one implementation, an error in localization of a user device is identified using a network component. The localization causes the user device to be resolved to a first storage location in a network. The error in localization is remedied by replacing a relative identifier pointing to the first storage location with an absolute identifier pointing to a second storage location in the network.

Additional implementations described and claimed herein address the forgoing problems, amount others, by dynamically rerouting a user device during the delivery of content to the user device. In one implementation, one or more stimuli corresponding to a connection to deliver content from a content source over a network to a user device along a network path are detected. The one or more stimuli indicate a connection issue. An optimized network path through which to deliver the content to the user device is determined based on current network conditions. The optimized network path responds to the connection issue. The user device is dynamically rerouted to the optimized path while providing a substantially continuous delivery of content to the user device.

Further implementations described and claimed herein address the foregoing problems, among others, by dynamically modifying one or more quality of service parameters during the delivery of content to a user device. In one implementation, a request for a manifest subset is received from a user device. The manifest subset corresponds to a delivery of content over a network to the user device. One or more quality of service parameters associated with the delivery of the content to the user device are detected using a network component. At least one of the quality of service parameters is dynamically modified based on current network conditions. The manifest subset is provided to the user device. The manifest subset identifies a set of one or more content segments constituting a portion of the content. The set of one or more content segments are delivered in response to separate requests in accordance with the at least one modified quality of service parameter.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 9 is an example of a computing system that may implement various systems and methods discussed herein.

DETAILED DESCRIPTION

Figure 1:
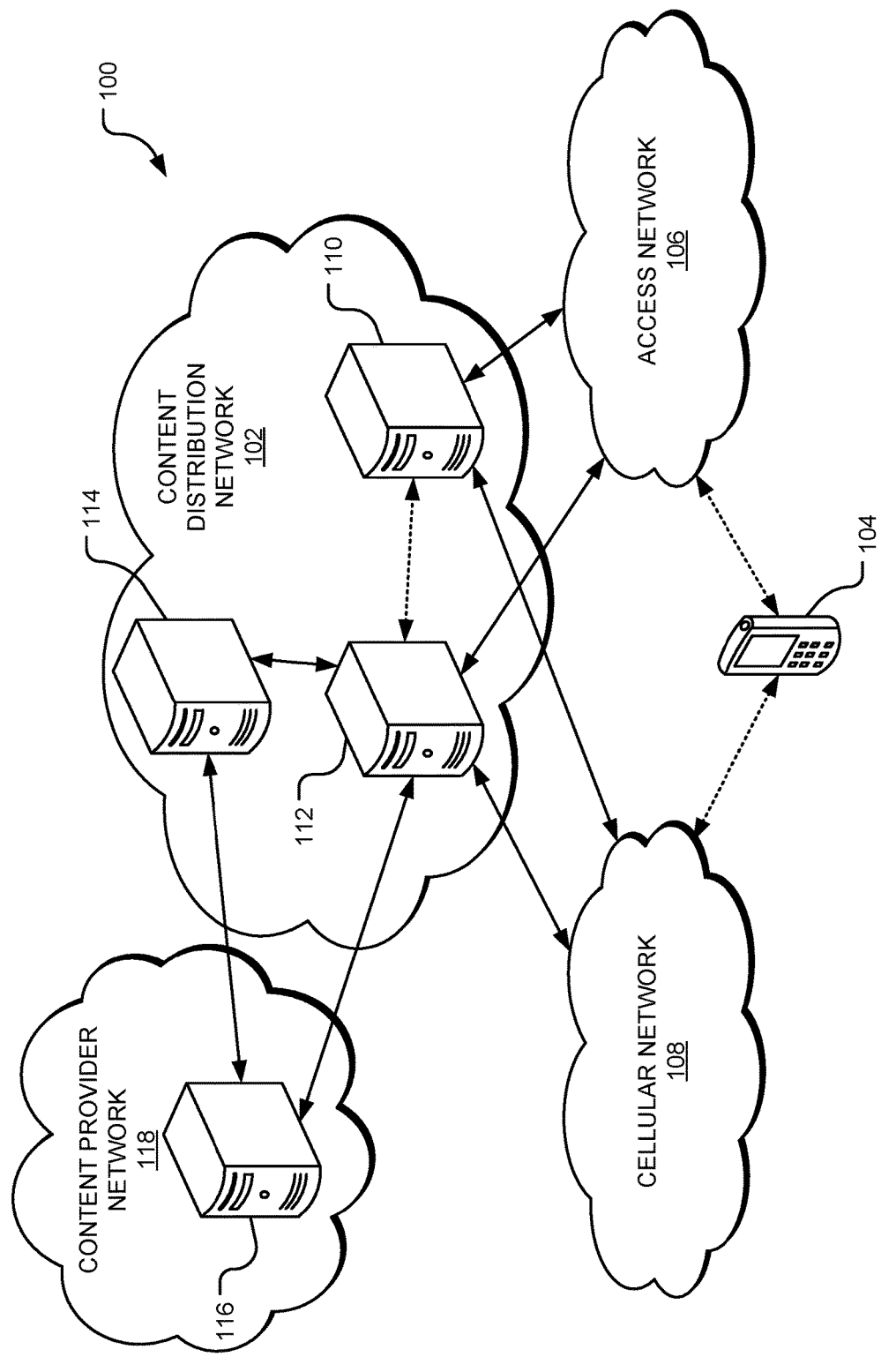
FIG. 1 is an example network environment for distributing content using a series of manifest subsets.

Aspects of the present disclosure involve systems and methods for dynamic re-localization and manifest chunking in a content delivery network (CDN). In one aspect, a manifest file is served as a series of subsets, thereby permitting the CDN to dynamically reroute requests for content segments based on changing locations or networks, changing network conditions (e.g., available network capacity), and the like.

For example, a user may wish to watch a movie through a website on a mobile phone connected to the CDN via a wired access network. To start the movie, a link in the website to the movie may be selected, which causes a request to be sent to a directory server in the CDN. The directory server responds to the request by providing a network address (e.g., Internet Protocol (IP) address) from which the movie may be retrieved. In doing so, the directory server determines a location from which to serve the movie based on a geographical location of the access network and/or other network policies.

To enable the user to play the movie from various points (e.g., different chapters in the movie) the movie is split into segments or chunks, and each movie segment is served to the phone in response to a separate request. To retrieve the movie segments, a series of manifest subsets, each subset corresponding to one or more of the movie segments, is utilized. In response to the request for the movie, an identifier (e.g., a universal resource locator (URL)) to a first manifest subset is returned to the phone. The first manifest subset includes a series of identifiers pointing to location(s) from which a first set of corresponding movie segments may be retrieved. The phone requests the first movie segments in a sequence specified by the first manifest subset.

At the end of the sequence, the first manifest subset includes an identifier to a second manifest subset that causes a request to be sent to the directory server. The directory server responds to the request by providing a network address and determining location(s) from which to serve a second set of movie segments corresponding to the second manifest subset. Accordingly, if the user disconnects from the access network and continues watching the movie on the phone via a wireless network, such as cellular, WiMAX, WiFi, or the like, the directory server may change the location(s) from which the movie segments are served based on the wireless network and/or other network policies. The second manifest subset is returned the phone with a series of identifiers pointing to location(s) from which the second movie segments may be retrieved. The phone requests the second movie segments in a sequence specified by the second manifest subset.

The movie segments are played on the phone in a sequence specified by the series of manifest subsets. The phone will continue to retrieve manifest subsets and corresponding movie segments until the movie stops playing. From the perspective of the user, the movie is played continuously regardless of the change from the access network to the wireless network.

When the movie segments are requested and retrieved, relative URLs are generally used. The relative URLs point to each of the movie segments in relation to a base URL. As described above, in response to a request for a manifest subset, the directory server determines an appropriate location from which to serve the movie segments based on the location of the phone and other network policies, and a base URL to that location is provided to the phone. Once the base URL is received, relative paths will continue to be added onto the base URL to obtain subsequent movie segments corresponding to the retrieved manifest subset from the location determined by the directory server. Initial localization operations determine a location from which to serve the movie segments to the phone based on conventional localization algorithms and techniques. However, the initial localization operations performed by the directory server may suffer from a localization error, resulting in the movie segments being served from an inaccurate, erroneous, or otherwise inappropriate location. Thus, if the base URL points to an inappropriate location for serving the movie segments, utilizing a relative URL will result in the movie segments being served from the inappropriate location. Accordingly, in another aspect of the present disclosure, a relative URL is replaced with an absolute identifier to correct such localization errors.

For example, using the IP address of the phone, the CDN may determine the location of the phone. In doing so, the CDN may determine whether the initial localization operations failed and remedy the localization error at the application level by replacing the relative URL with an absolute URL. Using the absolute URL allows the phone to bypass the initial localization operations to retrieve the movie segments from an appropriate location by specifying a scheme identifying a protocol used to access the movie segments and the server hosting the content. As such, if the first manifest subset directs the phone to retrieve the movie segments from an inappropriate location, the second manifest subset may be returned with an absolute URL pointing to an appropriate location from which the second movie segments may be retrieved. Replacing a relative URL with an absolute URL is described in the context of content distribution and delivery. However, it will be understood that it may be applied in other contexts to remedy localization errors in a communication network.

In addition to rerouting a request to adapt to the mobility of the phone as the user changes from one attachment point (e.g., via the wired access network) to another attachment point (e.g., the wireless network), a request may be rerouted in response to other changing network conditions and performance over the lifetime of the connection of the phone to obtain the movie. A request routing system, such as the directory server, obtains a real time feed of data from various information sources from which one or more stimuli may be detected. The stimuli may be used to identify when the phone changes from one attachment point to the network to another, as described above, as well as to identify any problems or changes in the network affecting the quality of the connection. The directory server optimizes the network path over which the movie is served and/or modifies one or more quality of service parameters in response to the detected stimuli to improve or maintain the quality of the connection. Generally, the request for the movie may be dynamically rerouted based on a variety of current network conditions, such as network topology, content source infrastructure, an attachment point of the phone to the network, and the like, and one or more quality of service parameters may be dynamically modified throughout the delivery of the movie to optimize the connection.

For example, the directory server resolves the phone to one of a plurality of content servers in the CDN. If a server group reaches a certain threshold, the directory server will shed the load to another location (i.e., reduce the amount requests to the server group) to avoid the link from becoming saturated and to reduce network traffic congestion. However, even in this case, the content server may fail or suffer from performance degradation during the delivery of the movie, affecting the capability of the CDN to deliver the movie to the phone. However, rather than effecting a new connection like many conventional CDNs, the phone is dynamically rerouted to another content server to obtain the next movie segment or manifest subset, while providing a substantially continuous delivery of the movie to the phone.

While the above examples are described in the context of delivery and presentation of a movie on a phone, it will be understood that the presently disclosed technology may be implemented to deliver and present a variety of content, including, but not limited to, videos, multimedia, images, audio files, documents, software, data files, patches, and other electronic resources, on various types of user devices. Further, a request for content may be dynamically rerouted and quality of service parameters dynamically modified in response to a variety of network conditions.

For a detailed discussion of dynamic re-localization and manifest chunking in a content distribution network, reference is made of FIG. 1. As shown, an example network environment 100 for distributing content using a series of manifest subsets includes a CDN 102, which may include components of one or more networks. In one implementation, the CDN 102 is communicably coupled to one or more wired networks (e.g., access network 106) and one or more wireless networks (e.g., cellular network 108). The access network 106 and/or the cellular network 108 may be under the control of or operated/maintained by one or more entities, such as, for example, one or more Internet Service Providers (ISPs) or Mobile Network Operators (MNOs) that provide access to the CDN 102. Thus, for example, the access network 106 and the cellular network 108 may provide Internet access to a user device 104.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, data files, patches, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 or an intermediate device, for example, in the access network 106 or the cellular network 108. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, the content is split into segments or chunks of approximately two to ten second fragments, each of the content segments being served in response to a separate request. The content segments may be encoded at various bit rates, such that the user device 104 may request segments of an appropriate bit rate based on network conditions as the content is being presented on the user device 104. Segmentation of the content permits seeking to parts of the media (e.g., different chapters in a movie) without needing to download the entire content file.

In one implementation, to retrieve content segments from different storage locations in the network environment 100 and to configure and sequence the segments, a series of manifest subsets or chunks is utilized. Each of the manifest subsets corresponds to one or more content segments. The manifest subsets and the content segments may be fetched using a data transport protocol, including, but not limited to, File Transport Protocol (FTP), Hypertext Transport Protocol (HTTP), etc. The manifest subsets may be, for example, an Extensible Markup Language (XML) based files. Each of the manifest subsets includes a series of URLs pointing to the storage locations of the corresponding content segments. Stated differently, each of the manifest subsets specifies a relative URL to identify the location of corresponding content segments at each bit rate. Once a manifest subset is received, the user device 104 requests segments of the content of an appropriate bit rate (e.g., based on the rate at which the user device 104 is receiving the content data) in a sequence specified by the manifest subset as the presentation of the content progresses.

Splitting and serving the manifest file in subsets provides an opportunity to tune the CDN 102 in a variety of manners after a session presenting content on the user device 104 has begun. For example, even if the user device 104 disconnects from the access network 106 and connects to the cellular network 108 after a session starts, the user device 104 presents the content as a continuous stream with a substantially seamless change in networks from the user perspective. The location from which the content segments are served and the bit rates may be changed as each manifest subset is retrieved. As such, serving the manifest file in subsets may force re-localization using the directory server 110 if, for example, the user device 104 moves from the access network 106 to the cellular network 108. Each request for a manifest subset provides an opportunity to dynamically reroute the path or change the bit rate after a session has begun based on changing network topology (e.g., due to changing networks), changing network conditions (e.g., available network capacity), or changing locations.

In one implementation, after a session is initiated by requesting content using the user device 104, a URL to a first manifest subset is returned and an appropriate storage location (e.g., geographically or logically proximate) from which one or more first content segments associated with the first manifest subset may be retrieved is resolved through the CDN 102. The user device 104 requests the first content segments as specified by the first manifest subset. In one implementation, at the end of the first manifest subset, a URL to a second manifest subset is included that causes a request to be sent to the directory server 110.

Upon receiving the request for the second manifest subset, the directory server 110 provides a network address (e.g., an IP address) pointing to an edge cache cluster, one of the servers 110, 112, 114, or some other storage location from which a second set of content segments may be served as specified in the second manifest subset. Accordingly, if the user device 104 disconnects from the access network 106 and continues presenting the content on the user device 104 via the cellular network 108, the directory server 110 may change the location(s) from which the content segments are served based on the cellular network 108 and/or other network policies. The second manifest subset is returned the user device 104 with a series of URLs pointing to location(s) from which the second movie segments may be retrieved. In other words, the URLs in the second manifest subset corresponding to each of the second set of content segments are resolved to a network address from which the user device 104 may retrieve the content segments. The user device 104 requests the second movie segments in a sequence specified by the second manifest subset. The user device 104 will continue to retrieve manifest subsets and corresponding content segments until the session ends. With the retrieval of each manifest subset, there is an opportunity to change content retrieval parameters (e.g., the path through which the content is served, the bit rates, or other network or content delivery parameters).

Figure 2:
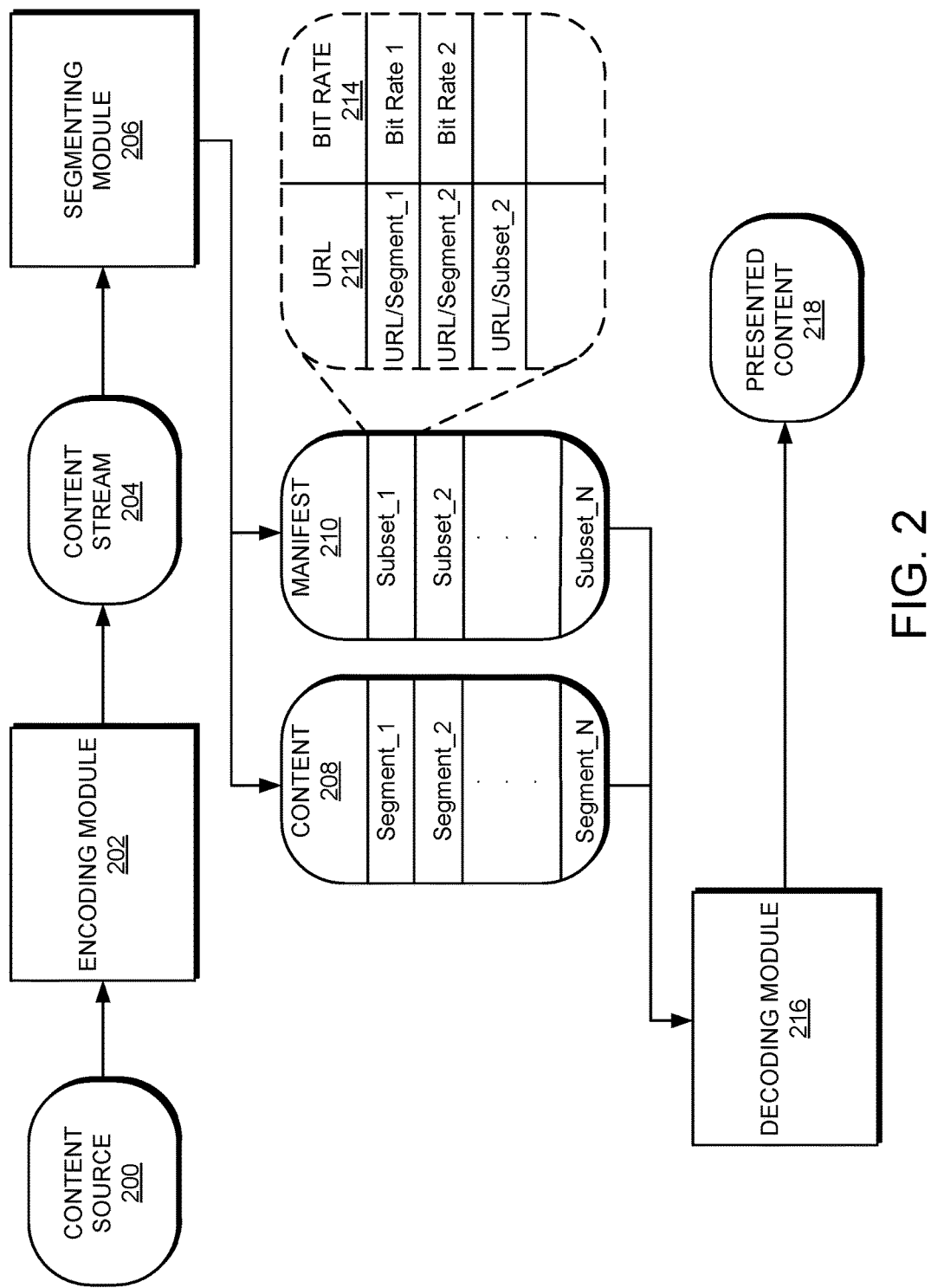
FIG. 2 illustrates a series of manifest file subsets, each identifying one or more content segments.

As can be understood from FIG. 2, in one implementation, after a user initiates a session on a user device (e.g., plays a video), a content encoding module 202 encodes content 200 into a transport stream 204, and a stream segmenting module 206 splits the stream 204 into content segments 208. The stream segmenting module 206 creates a series of manifest subsets 210, such that each of the manifest subsets 210 include one or more identifiers (e.g., URLs) identifying corresponding consecutive content segments 208. Each of the manifest subsets 210 may also include information about each of the corresponding content segments, including, without limitation, a bit rate of the content segment (e.g., in kilobits per second), a codec used to encode the content segment, a resolution of the content segment (e.g., in pixels), markers, frame rates (e.g., in frames per second), and captions.

The content 200 may be available at various bit rates. In one implementation, a distinct manifest file is available for each available bit rate. For example, if the content 200 is available at five different bit rates, five separate manifest files will exist for the content 200, each bit rate corresponding to one of the manifest files. For a specific bit rate, the corresponding manifest file includes a series of manifest subsets 210 which have one or more identifiers (e.g., URLs) identifying corresponding consecutive content segments 208 at the specific bit rate. In one implementation, the content segments 208 are listed in the same consecutive order in each of the manifest files for the content 200, but each manifest file includes different identifiers pointing to the content segments 208 at the different available bit rates.

In one implementation, in response to a request for content, the user device receives Subset_1 of the manifest subsets 210. As shown in FIG. 2, Subset_1 of the manifest subsets 210 includes one or more URLs 212 and information (e.g., bit rates 214) that identify how and where to locate a corresponding content segment. For example, Subset_1 identifies the URLs 212 and bit rates 214 corresponding to Segment_1 and Segment_2 of the content 208. The user device requests Segment_1 and Segment_2 of the content 208 in a sequence specified by Subset_1 of the manifest subsets 210. At the end of the sequence, the Subset_1 of the manifest subsets 210 includes a URL to a Subset_2 of the manifest subsets 210, which directs the user device to request the next consecutive content segments 208.

As the content segments 208 are requested, the content segments 208 are received into a memory buffer in the user device. A decoding module 216 decodes the content segments 208 for the user device to present or play content 218. Because previous data is not relied upon in decoding the content, the bit rate of the content 200 may be changed without synchronization issues. The user device continues to request and receive the manifest subsets 210 and corresponding content segments 208 until the content 218 ends or the user terminates the session.

Figure 3:
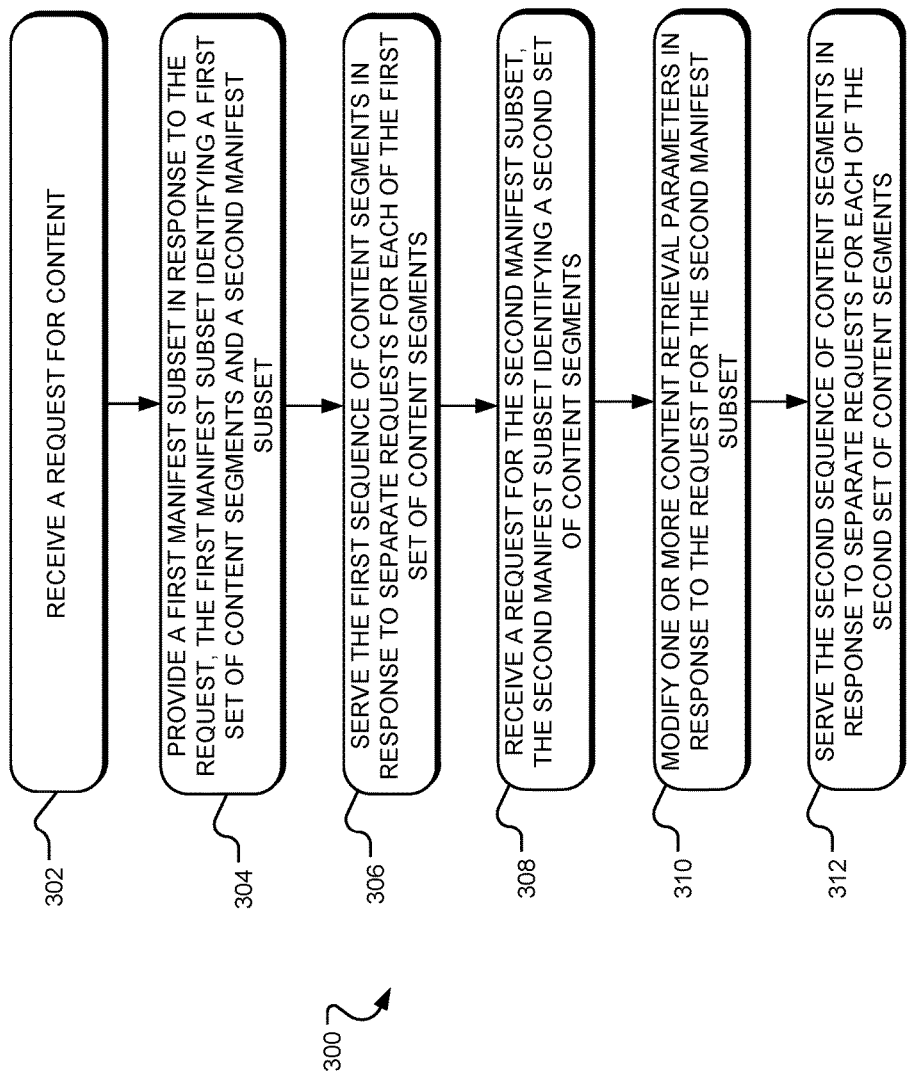
FIG. 3 illustrates example operations for distributing content using a series of manifest subsets.

Turning to FIG. 3, example operations 300 for distributing content using a series of manifest subsets are shown. In one implementation, a receiving operation 302 receives a request for content from a user device. The request may be generated upon selection or entering of a link to the content in an Internet application. Further, the request may specify a particular point in the content (e.g., a specific chapter in a movie) from which to present the content.

To retrieve one or more content segments corresponding to the request from storage location(s) in a network and to configure and sequence the segments, a providing operation 304 provides a first manifest subset using a network component. The first manifest identifies a first set of one or more content segments and a second manifest subset. In one implementation, the first manifest subset identifies the first set of content segments with one or more URLs pointing to the location(s) from which the content segments may be retrieved.

A serving operation 306 serves the first set of content segments in response to separate requests from the user device for each of the first set of content segments. The user device requests the first set of content segments in a sequence specified by the first manifest subset. Accordingly, in one implementation, the serving operation 306 serves the first set of content segments based on an order in which the first set of content segments are identified in the first manifest subset.

At the tail or otherwise at the end of the sequence of the identifiers, the first manifest subset includes an identifier to the second manifest subset. In one implementation, after the serving operation 306 serves each of the first set of content segments, a receiving operation 308 receives a request for the second manifest subset.

Upon the request for the second manifest subset, in one implementation, a modifying operation 310 modifies one or more content retrieval parameters. Stated differently, the modifying operation 310 may tune the network through which the content is delivered in a variety of manners in response to the request for the second manifest. For example, the modifying operation 310 may resolve the user device to a location from which to serve a second set of one or more content segments that is different from the location(s) from which the first set of content segments were served. Accordingly, if the user device changes networks or physical locations, the modifying operation 310 may change the location(s) from which the content segments are served based on the changed network, physical location, and/or other network policies. The modifying operation 310 may otherwise change the path through which content segments are served. Additionally, the modifying operation 310 may change the bit rate of the one or more of the content segments. Other content delivery changes or tuning of the network are also contemplated herein.

The second manifest subset is then provided to the user device based on the modified content retrieval parameters. The second manifest subset identifies a second set of one or more content segments. In one implementation, the second manifest subset identifies the second set of content segments with one or more URLs pointing to the location(s) from which the content segments may be retrieved. A serving operation 312 serves the second set of content segments in response to separate requests from the user device for each of the second set of content segments. The user device requests the second set of content segments in a sequence specified by the second manifest subset. Accordingly, in one implementation, the serving operation 312 serves the second set of content segments based on an order in which the second set of content segments are identified in the second manifest subset.

In another implementation, the providing operation 304 provides a localized URL to the second manifest subset with the first manifest subset. As such, the URL to the second manifest subset may be dynamically generated by the network component providing the first manifest subset based on a location of the user device. The corresponding content segments will be served as described herein upon separate requests from the user device.

The operations will repeat as necessary until each of the requested content segments has been served. Stated differently, manifest subsets and corresponding content segments will continue to be served until each of the content segments has been received by the user device. Further, the modifying operation 310 will modify one or more content retrieval parameters upon each request for a manifest subset as needed to tune the network and/or content delivery.

Figure 4:
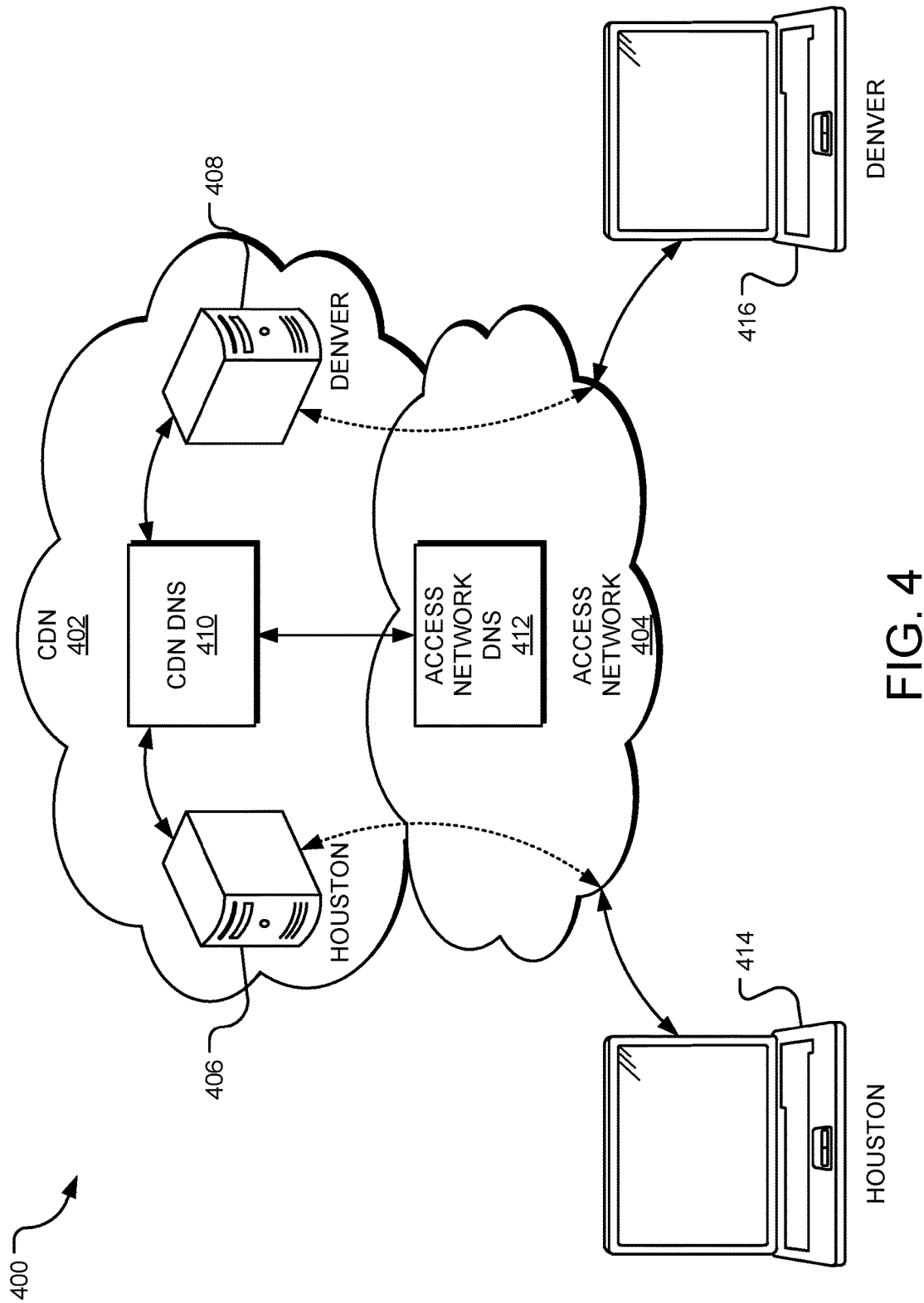
FIG. 4 displays an example network environment having a caching infrastructure that utilizes an absolute URL in a manifest file to correct localization errors.
Figure 5:
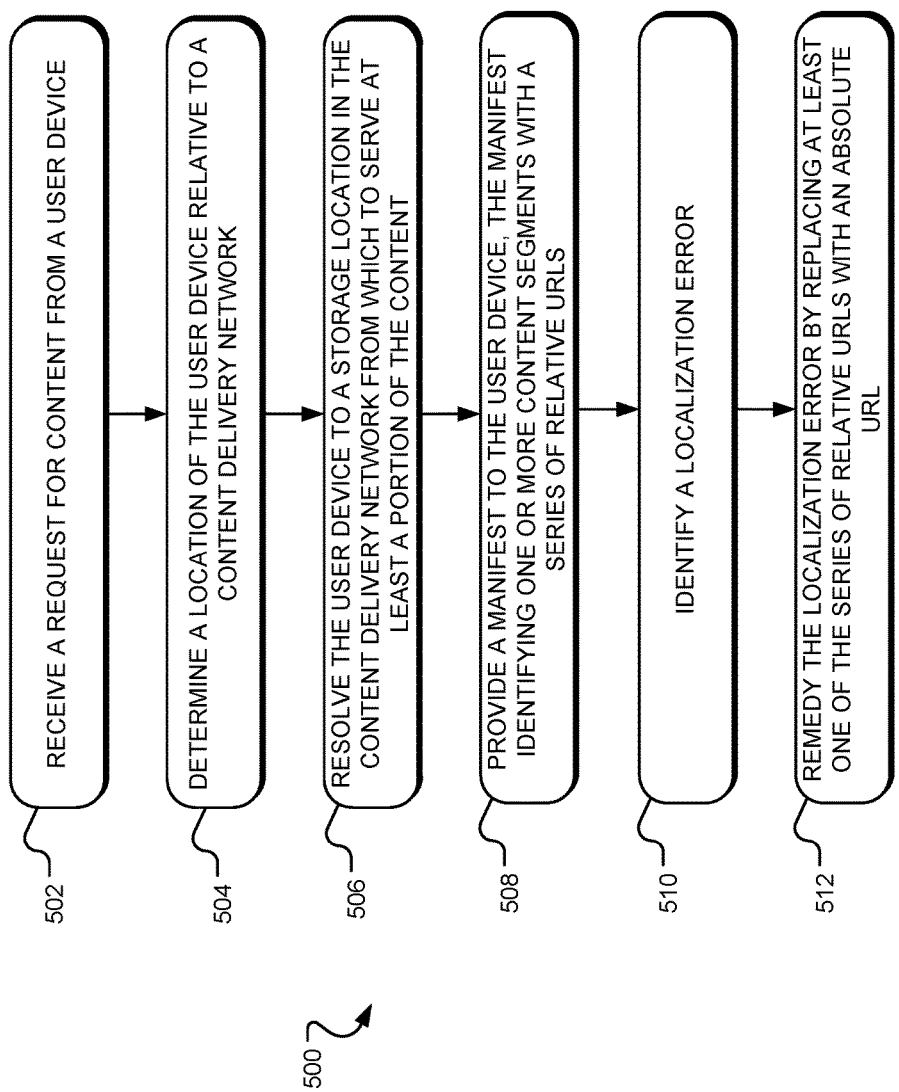
FIG. 5 illustrates example operations for correcting localization errors using an absolute URL.

As can be understood from FIGS. 1-3, the example operations 300 may be used to tune a network or content delivery parameters in a variety of manner after a session presenting content has begun. Turning to FIGS. 4-5, it will be appreciated that localization errors may be additionally remedied at the application protocol level (e.g., hypertext transfer protocol level) by replacing a relative identifier with an absolute identifier.

FIG. 4 displays an example network environment 400 having a caching infrastructure that utilizes an absolute URL in a manifest file to correct localization errors. In one implementation, the network environment 400 includes one or more content delivery networks (CDN) 402 for delivery of content from one or more content providers to end-users. The CDN 402 is communicably coupled to one or more access networks 404 that provide access to the Internet for end-users and/or content providers.

The one or more CDNs 402 may each have CDN caches located in various locations (both physical and logical), for example, a Houston cache cluster 406 and a Denver cache cluster 408. The network environment 400 may further include cache devices on the client/subscriber side of the access networks 404, which may be referred to as "deep caches," "shared caches," or "local caches," providing the opportunity to retrieve content without having to communicate with storage devices across the access networks 404. Each such cache device may be shared amongst proximally located end-users, for example, via wired access or a wifi access point.

In one implementation, the CDN 402 includes a CDN domain name system (DNS) 410 that is communicably coupled to the Houston cache cluster 406 and the Denver cache cluster 408, for example, across the Internet. The CDN DNS 410 includes one or more directory servers, as described herein, that determine at least one appropriate CDN cache for delivering requested content to end-users. In one implementation, the access network 404 includes an access network DNS 412 having one or more directory servers, as described herein. The access network DNS 412 is configured to interact with the CDN DNS 410 to provide end-users of the access network 404 access to the CDN 402 to request and retrieve content.

As described herein, content has a network address (e.g., an IP address) that may be encoded by a URL. An absolute URL includes: a scheme identifying a protocol used to access the content; a name of the server hosting the content; and the name of the content given as a path. A relative URL does not contain the protocol or server information. Instead, relative URLs are resolved to full URLs using a base URL. Stated differently, a relative URL points to a file in relation to a present file. For example, a relative URL to a first segment of content may be "base_URL/segment_1"

When requesting and receiving content, often manifest files utilize relative URLs. When using a relative URL, the CDN DNS 410, alone or in conjunction with the access network DNS 412, resolves a user device (e.g., user devices 414 or 416) to at least one of the CDN caches 406 and 408 in response to a request for content. Generally, the user device 414 or 416 is resolved to an appropriate CDN cache based on the location of the user device 414 or 416 or other network policies. For example, if the user device 414 is located in Houston, it may be resolved to the Houston cache cluster 406, and if the user device 416 is located in Denver, it may be resolved to the Denver cache cluster 408. Once a base URL is received, relative paths will continue to be added onto the base URL to obtain subsequent content segments.

Accordingly, if a user device is resolved to an inappropriate location with respect to the base URL, utilizing a relative URL will result in each of the subsequent content segments being retrieved from that location. For example, if the Houston user device 414 is erroneously resolved to the Denver cache cluster 408 in response to a request for content, a relative URL will result in content segments continuing to be served to the Houston user device 414 from the Denver cache cluster 408.

In one implementation, where the initial localization performed by the CDN DNS 410 and/or the access network DNS 412 is determined (e.g., using the IP address) to be inaccurate, erroneous, or otherwise inappropriate, the relative URL in the manifest file is replaced with an absolute URL during the resolution process. Replacing the relative URL with an absolute URL forces the content segments to be served from an appropriate (e.g., local) server. For example, to correct the localization error in the example described above, the relative URL in the manifest file may be replaced with an absolute URL directing the Houston cache cluster 406 rather than the Denver cache cluster 408 to serve content segments to the Houston user device 414.

Where the manifest file is split into subsets, the URL to the next manifest file subset may be a relative URL after the initial localization is performed by the CDN DNS 410 and/or the access network DNS 412. After the first manifest file subset and corresponding content segments are returned to a user device, the relative URL may be replaced with an absolute URL for subsequent manifest file subsets and corresponding content segments if it is determined that the content should be served from a different server. Accordingly, localization errors may be corrected without interrupting data playback or content presentation.

FIG. 5 illustrates example operations 500 for correcting localization errors using an absolute URL. In one implementation, a receiving operation 502 receives a request for content, a content segment, or other resource from a user device. A determining operation 504 determines a location of the user device relative to a content delivery network using conventional localization algorithms or techniques. A resolving operation 506 resolves the user device to an appropriate location from which to serve the requested content based on the determining operation 504 and/or a physical location of the user device, a network to which the user device is connected, and other network policies.

A providing operation 508 provides a manifest to the user device. In one implementation, the providing operation 508 provides a manifest or manifest subset identifying one or more content segments with a series of relative URLs. The relative URLs point to each of the content segments in relation to a base URL. Accordingly, once the base URL is received, relative paths will continue to be added onto the base URL to obtain subsequent content segments based on the determining operation 506.

An identifying operation 510 identifies whether the determining operation 504 or resolving operation 506 suffered from a localization error, resulting in the content segments being served from an inaccurate, erroneous, or otherwise inappropriate location. If the identifying operation 510 identifies no localization error, the providing operation 508 may continue to provide manifest subsets and/or content segments to the user device according to the resolving operation 506 upon request from the user device. If the identifying operation 510 identifies an error in the determining operation 504 or resolving operation 506 (e.g., using the IP address of the user device), a remedying operation 512 remedies the localization error.

In one implementation, the remedying operation 512 remedies the localization error at the application level by replacing the relative URL with an absolute URL. In one implementation, the URL is replaced in a subsequent manifest subset. Using the absolute URL allows the user device to bypass the determining operation 504, such that the resolving operation 506 is directed to an appropriate storage location specified by the absolute URL from which to retrieve the content segments. Stated differently, the remedying operation 512 specifies a scheme identifying a protocol used to access the content segment(s) and the server hosting the content segment(s).

Accordingly, the retrieval of each manifest subset, as described herein, provides an opportunity not only to tune the content delivery network and/or content delivery parameters, but also to correct localization errors. As such, if the first manifest subset directs a user device to retrieve content segments from an inappropriate location, a second manifest subset may be returned with an absolute URL pointing to an appropriate location from which second content segments may be retrieved. Replacing a relative URL with an absolute URL is described in the context of content distribution and delivery. However, it will be understood that it may be applied in other contexts to remedy localization errors in a communication network.

Figure 6:
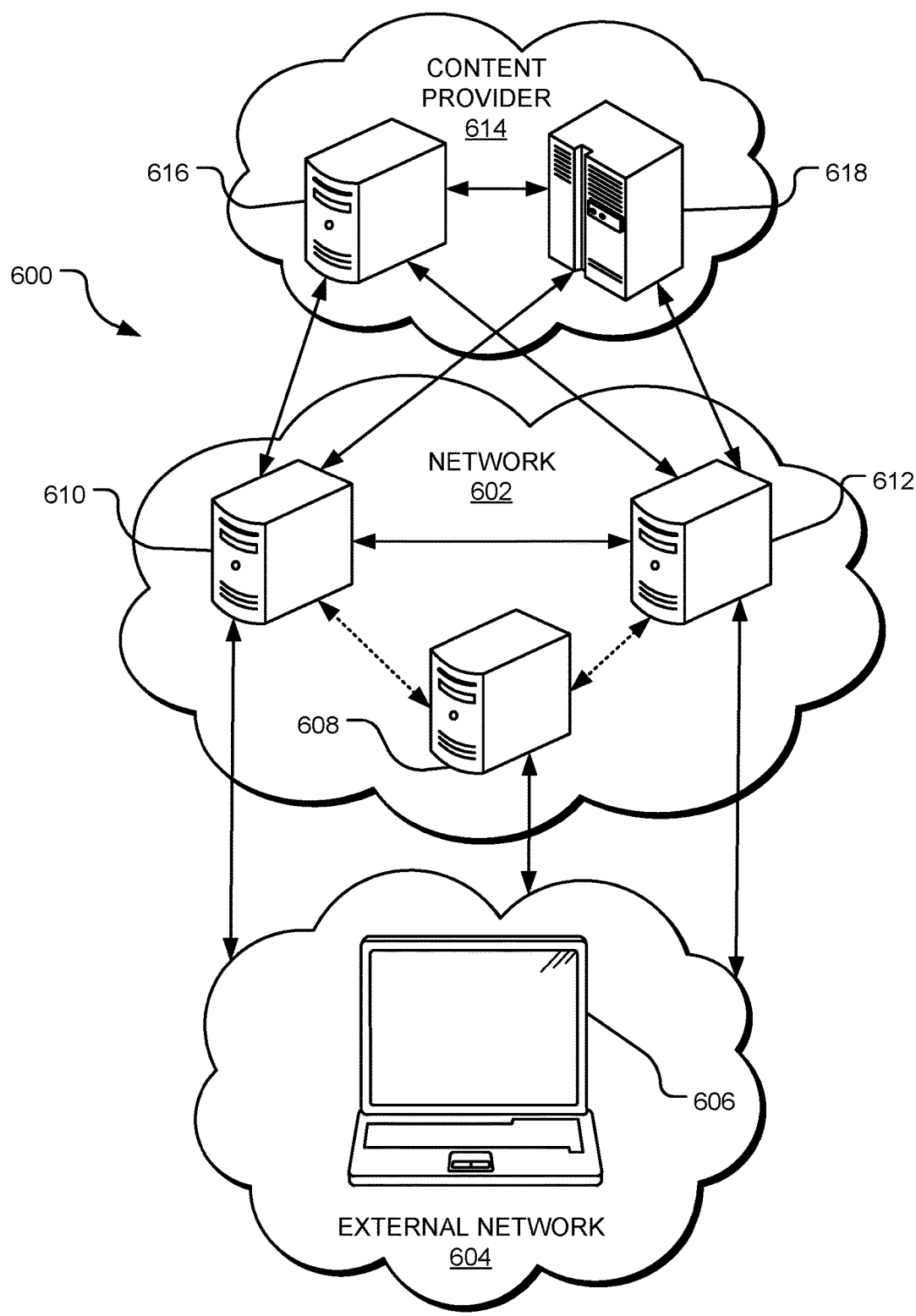
FIG. 6 an example network environment for delivering content based on current network conditions.

For a detailed discussion of an example network environment 600 for delivering content based on current network conditions, reference is made to FIG. 6. In one implementation, one or more networks 602 include numerous components, including, but not limited to, gateway routers and devices, servers and registrars, switches, routers, and the like. Such components are not shown or described in detail here because those skilled in the art will readily understand these components. Further, many of the components outlined above with respect to the network environments of FIGS. 1 and 4 may be similarly included in the network environment of FIG. 6. In one implementation, the network 602 includes one or more CDNs for delivery of content to end users.

In one implementation, the network 602 is communicably coupled to one or more external networks 604, which may be under the control of or operated/maintained by one or more entities, such as, for example, one or more ISPs or MNOs that provide access to the network 602 as well as other network/communication related services. Thus, for example, the external network 604 may provide Internet access to a user device 606, which may be generally any form of computing device, as described herein. Communication via any of the networks may be wired, wireless, or any combination thereof. The external network 604 provides the user device 606 an attachment point to access the network 602. As such, the attachment point of the user device 606 to the network 602 may be wired, wireless, or any combination thereof. In one implementation, one or more links connect the external network 604 to the network 602. In general, a link is a transmission channel between two points, typically between two networks. In an IP network environment, the links provide the IP interconnect between the external network 604 and the network 602, such that an IP address is shared between the external network 604 and the network 602 to communicate between network devices and components.

To obtain content, the user device 606 causes (e.g., using a link in an Internet browser application) a request to be sent to a directory server 608, which responds to the request by providing a network address (e.g., an IP address) where the content associated with the request may be retrieved, as described herein. In one implementation, the directory server 608 provides a DNS service, which resolves a domain name to an associated network address from which the user device 606 can retrieve the requested content.

The network 602 may include one or more storage server clusters in various locations (both physical and logical) for storing one or more files of content. Such server clusters may include a single server or one or more racks of servers. In one implementation, the network 602 includes edge servers 610, 612, which may cache content from another server to make it available in a more geographically or logically proximate location to the user device 606. The edge servers 610, 612 are configured to respond to a request for content by providing the requested content from a content source to a requestor, which may be the user device 606 or an intermediate device, for example, in the external network 604. In one implementation, the responding edge server 610 or 612 provides the requested content that is locally stored in cache. In another implementation, the responding edge server 610 or 612 retrieves the requested content from another source, such as a media access server (e.g., a content distribution server) or a component in an infrastructure of a content provider 614. Such components may include, without limitation, a server 616, a storage appliance 618, and other network components and storage devices. Generally, the storage appliance 618 manages the storage of content and other data on storage media, which may involve spinning media (e.g., disc drives) as well as various forms of solid state memory or other memory.

Additional servers or other storage devices may be included on the user/subscriber side of the external network 604, providing the opportunity to retrieve content without having to communicate with storage devices across the external network 604. Each such storage device may be shared amongst proximally located end-users, for example, via wired or wireless attachment points.

In one implementation, the directory server 608 is communicably coupled to the edge servers 610, 612. In response to a request for content, the directory server 608 determines at least one appropriate server (e.g., the edge server 610 and/or the edge server 612) for delivering the requested content. In one implementation, the edge server 610 or 612 determines whether the directory server 608 properly localized the user device 606. Stated differently, the edge server 610 or 612 provides a second level of protection by verifying that the directory server 608 identified an appropriate server from which to serve the requested content. If the edge server 610 or 612 determines that the user device 606 was not resolved to an appropriate server or if network conditions changed such that the identified server is no longer appropriate, the edge server 610 or 612 modifies the manifest as described herein to direct the user device 606 to an appropriate server.

The edge server 610 or 612 may determine the appropriate server based on a variety of factors and network policies. For example, the edge server 610 or 612 may obtain information from the directory server 608 and/or access one or more databases that store information concerning the network 602, the external network 606, and/or one or more routing rules based on a routing policy. This information may indicate the user device 606 has changed attachment points to the network 602 or otherwise that the server identified by the directory server 608 is no longer appropriate. Moreover, this information may include a general topology of the network 602 as related to an underlying IP network and/or interconnection data relating to the communications between the network 602 and the external network 606. The interconnection data may further include information regarding an infrastructure of the external network 606. Additionally, the one or more databases may store information pertaining to an infrastructure of the content source 614.

The information stored in the one or more databases as well as data obtained in substantially real time from various sources may be used to estimate current network conditions relating to the network 602, the external network 604, and/or the content source (e.g., the content provider 614). Such information sources may include, without limitation, one or more feeds of routing protocol information, one or more feeds of network management protocol information, one or more system logs, one or more feeds of network interconnection information, and the like. For example, the network routing protocol information may include a Border Gateway Protocol (BGP) feed or an Interior Gateway Protocol (IGP) feed associated with one or more routes through the network 602 to determine an estimated topology of the network 602. The network management protocol information may include, for example, a Simple Network Management Protocol trap feed to monitor the performance of one or more network components (e.g., routers, switches, servers, computing devices, etc.). Generally, the system logs are generated by various network components to trace activity and record events pertaining to the performance of the network components. Network interconnection information may include, for example, data relating to one or more trunks connecting the external network 604 to the network 602 and/or an IP address of the user device 606 to provide estimates of a topology of the external network 604 and of an attachment point of the user device 606 to the network 602.

In one implementation, once the user device 606 requests content, the directory server 608 establishes a connection to deliver content from a content source over the network 602 along a network path. Over the life time of the connection, the information obtained from the various feeds in substantially real time is analyzed by one or more network components (e.g., the edge server 610, 612, the directory server 608, and/or the like) to optimize the network path and a quality of service in delivering the content. In one implementation, the information is analyzed to identify a connection issue.

The connection issue may relate to the user device 606 changing attachment points to the network 602. For example, the user device 606 may disconnect from a wired access network and connect to a wireless network (e.g. cellular network) during the lifetime of the connection, as described herein. The connection issue may further relate, without limitation, to a performance of one or more components of the topology of the network 602; a performance of one or more components of the infrastructure of the content source; an interconnection between the external network 604 and the network 602; a performance of one or more components of the external network 604; a performance of the user device 606; or any other conditions pertaining to the performance of any aspect of the network environment 600 in delivering content to the user device 606.

In one implementation, the network component identifies a connection issue by detecting one or more stimuli relating to changes in performance or operation of the network environment 600. The network component may detect the stimuli based on an analysis of the information feeds indicating that one or more parameters of the connection or content delivery changed and/or a quality of the connection or content delivery has been impacted by changes in the network environment 600. The stimuli may include, without limitation, link or node failures of network components, such as routers, gateways, or switches, in the network 602 and/or other networks in the network environment 600; network traffic congestion; suboptimal latency in delivering the content; an overload of the edge server 610 or 612 or an uplink to the content source; the user device 606 changing attachment points to the network 602; a power loss to one or more of the components in the network environment 600; a failure of one or more components in the infrastucture of the content provider 614 (e.g., the content origin server 616 or the storage appliance 618); and any other failures or degradations in performance of one or more components in the network environment 600 or changes in performance or operation of the network environment 600. For example, a link or node failure of a router in the network 602 may be detected based on an analysis of a BGP feed, and this failure may lead to suboptimal quality of the connection with the user device 606 to deliver requested content.

In response to detecting the stimuli, one or more components of the network 602 modify or otherwise optimize one or more quality of service parameters of the connection based on current network conditions. In one implementation, the current network conditions are determined based on a topology of the network 602, an infrastructure of the content source, an attachment point of the user device 606 to the network 602, and any other conditions pertaining to a performance of any aspect of the network environment 600 in delivering content to the user device 606. The quality of service parameters relate generally to the content and/or the delivery of the content. The quality of service parameters may, without limitation, relate to transmission parameters; formatting parameters; processing parameters; delivery parameters; and other network parameters affecting the delivery or presentation of the content.

In one implementation, the transmission parameters generally involve transmission of one or more communications in the network environment 600 regarding the content. For example, the transmission parameters may involve a network path along which communications concerning the delivery of the content are transmitted to the user device 606 from the content provider 614 or other content source over the network 602. Where the detected stimuli indicate a connection issue that may be responded to or otherwise addressed by modifying the network path (e.g., a change in an attachment point of the user device 606 to the network 602), the edge server 610 or 612, for example, determines an optimized network path through which to deliver the content to the user device 606 over the network 602 based on current network conditions. The edge server 610 or 612 dynamically reroutes the user device 606 to the optimized network path while providing a substantially continuous delivery of the content to the user device 606.

In one implementation, the formatting parameters generally involve a format of the content for presentation on the user device 606. The formatting parameters may be modified based on current network conditions and/or capabilities of the user device 606. For example, the content format may be modified to increase a resolution of the content to high-definition or reduced to standard definition. In one implementation, the processing parameters generally involve a processing of the content for transmitting the content over a communications link in the network 602 and/or the external network 604. For example, a bit rate may be modified based on current network conditions. However, some content does not reasonably allow for a change in bit rate. As such, a manner in which the bits are conveyed or processed may be modified based on current network conditions (e.g., in response to network congestion) without changing the bit rate. In one implementation, the delivery parameters generally involve aspects of a delivery of the content to the user device 606 from the content source. For example, a client may subscribe to receive priority in a queue for delivery, such that the priority is modified based on current network conditions to ensure that the client receives a higher class of service.

The information feeds are analyzed over the lifetime of the connection to dynamically optimize the connection and delivery of content in response to changing network conditions. For example, in one implementation, the directory server 608 receives a request for a manifest subset from the user device 606 or an intermediate network component in the external network 604 or the network 602, as described herein. In response, a network component, such as the edge server 610 or 612, detects one or more quality service parameters associated with the delivery of the content to the user device 606. Based on the detection, the network component determines whether there is an opportunity to modify any of the quality of service parameters to optimize the connection or delivery of content. If such an opportunity is identified, at least one quality of service parameter is dynamically modified based on current network conditions. The manifest subset is served to the user device, as described herein, and a set of one or more content segments identified by the manifest subset are delivered in accordance with the at least one modified quality of service parameter.

Figure 7:
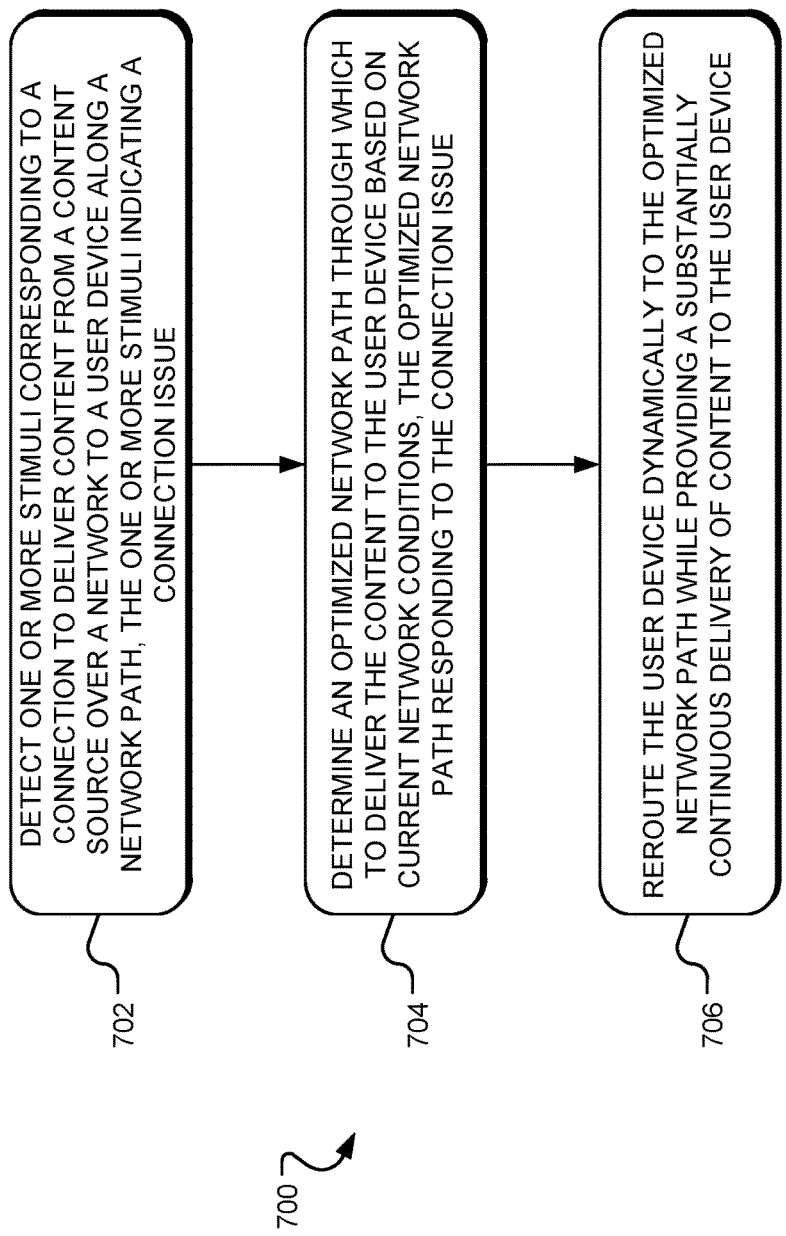
FIG. 7 illustrates example operations for dynamically rerouting a user device during the delivery of content to the user device.

Turning to FIG. 7, example operations 700 for dynamically rerouting a user device during the delivery of content to the user device are shown. In one implementation, a detecting operation 702 detects one or more stimuli corresponding to a connection to deliver content from a content source over a network to a user device along a network path. The network may comprise one or more networks, including external networks, as described herein. The one or more stimuli indicate a connection issue, which generally involves conditions pertaining to changes in performance or operation of any aspect of the network, to a delivery of the content to the user device, and/or a quality of the connection.

For example, in one implementation, the connection issue relates to the user device changing from a first attachment point to the network to a second attachment point to the network. For example, the first attachment point may be a wired attachment point and the second attachment point may be a wireless attachment point. The wireless attachment point may be in a wireless network, such as cellular, WiMAX, WiFi, or the like. In another implementation, the connection issue relates to a performance of one or more network components of a topology of the network that impacts a quality of the connection. In still another implementation, the connection issue relates to a performance of one or more components of an infrastructure of the content source that impacts a quality of the connection.

In one implementation, the detecting operation 702 detects the stimuli based on an analysis of one or more information feeds, which are obtained in substantially real time from various sources. The information feeds may include, without limitation, one or more feeds of routing protocol information, one or more feeds of network management protocol information, one or more system logs, one or more feeds of network interconnection information, and the like. Based on an analysis of the information feeds, the detecting operation 702 determines whether one or more parameters of the connection or content delivery changed and/or a quality of the connection or content delivery has been impacted by changes in the network and/or the content source.

A determining operation 704 determines an optimized network path through which to deliver the content to the user device based on current network conditions. In one implementation, the determining operation 704 determines the current network conditions based on a topology of the network, an infrastructure of the content source, an attachment point of the user device to the network, and any other conditions pertaining to a performance of any aspect of the network in delivering content to the user device. The determining operation 704 may utilize the information feeds to estimate current network conditions. The optimized network path responds to the connection issue. A rerouting operation 706 dynamically reroutes the user device to the optimized network path while providing a substantially continuous delivery of the content to the user device.

Figure 8:
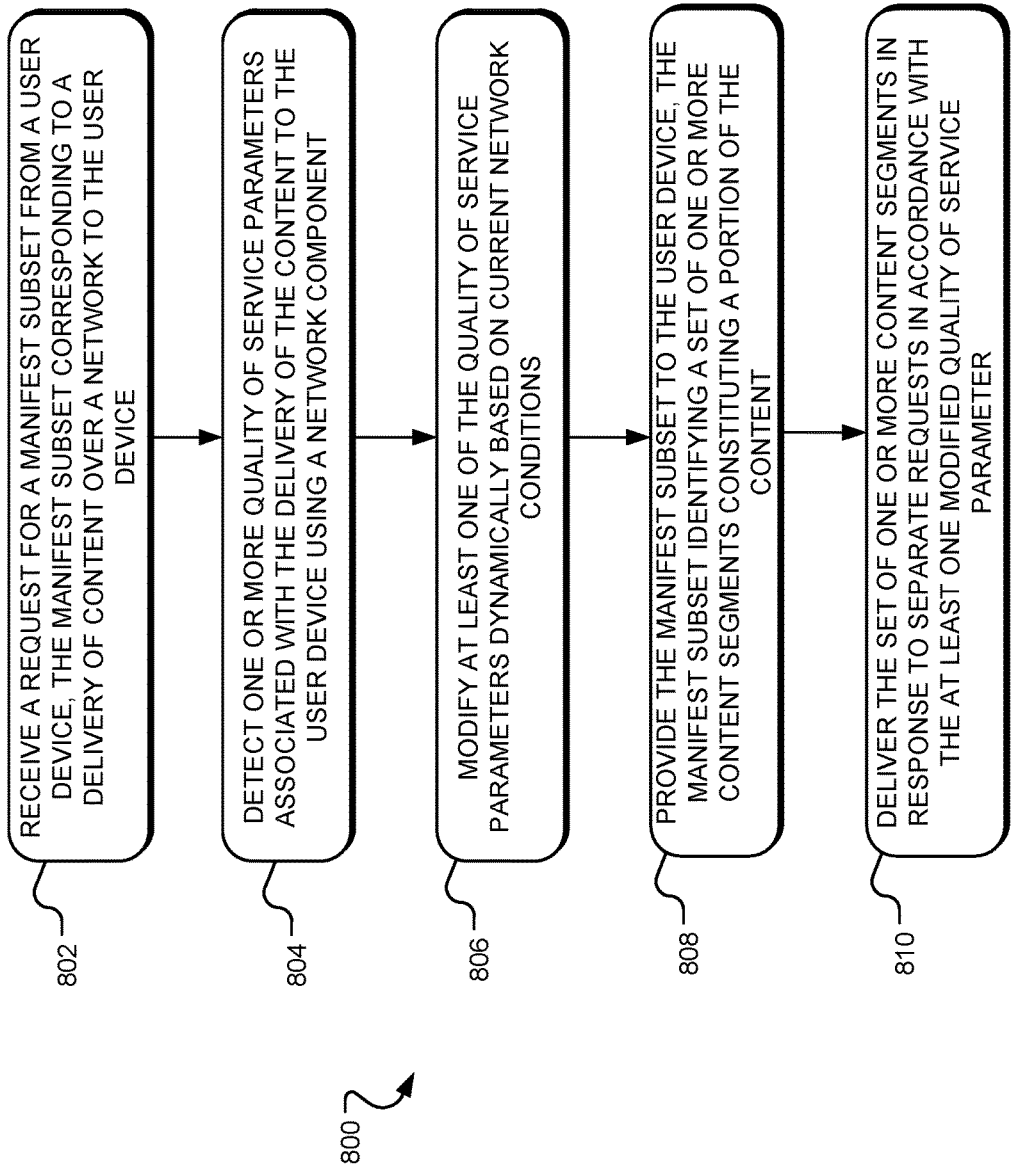
FIG. 8 shows example operations for dynamically modifying one or more quality of service parameters during the delivery of content to a user device.

For a detailed description of example operations 800 for dynamically modifying one or more quality of service parameters during the delivery of content to a user device, reference is made to FIG. 8. In one implementation, a receiving operation 802 receives a request for a manifest subset from a user device. The manifest subset corresponds to a delivery of content to the user device and identifies a set of one or more content segments constituting a portion of the content, as described herein.

A detecting operation 804 detects one or more quality of service parameters associated with the delivery of the content to the user device. The quality of service parameters relate generally to the content and/or the delivery of the content. The quality of service parameters may, without limitation, relate to transmission parameters; formatting parameters; processing parameters; delivery parameters; and other network parameters affecting the delivery or presentation of the content. In one implementation, the transmission parameters generally involve transmission of one or more communications in the network regarding the content; the formatting parameters generally involve a format of the content for presentation on the user device; the processing parameters generally involve a processing of the content for transmitting the content over a communications link in the network; and the delivery parameters generally involve aspects of a delivery of the content to the user device from the content source.

A modifying operation 806 dynamically modifies at least one of the quality of service parameters based on current network conditions. In one implementation, the modifying operation 806 determines the current network conditions based on a topology of the network, an infrastructure of the content source, an attachment point of the user device to the network, and any other conditions pertaining to a performance of any aspect of the network in delivering content to the user device.

A providing operation 808 provides the manifest subset to the user device, and a delivering operation 810 delivers the set of one or more content segments in response to separate requests in accordance with the at least one modified quality of service parameter. The providing operation 808 may provide the manifest subset from different nodes depending on the current network conditions. In one implementation, the operations 802 and 804 are repeated over the lifetime of the connection of the user device to the network to respond to changing network conditions. For example, in response to a request of each manifest subset or content segment, the detecting operation 804 detects the quality of service parameters to identify opportunities for optimizing the connection of the user device and/or the delivery of the content. In one implementation, when such opportunities are identified, the operations 806-810 may be performed.

Referring to FIG. 9, a detailed description of an example computing system 900 that may implement various systems and methods discussed herein is provided. A general purpose computer system 900 is capable of executing a computer program product to execute a computer process. Data and program files may be input to the computer system 900, which reads the files and executes the programs therein. Some of the elements of a general purpose computer system 900 are shown in FIG. 9 wherein a processor 902 is shown having an input/output (I/O) section 904, a Central Processing Unit (CPU) 906, and a memory section 908. There may be one or more processors 902, such that the processor 902 of the computer system 900 comprises a single central-processing unit 906, or a plurality of processing units, commonly referred to as a parallel processing environment. The computer system 900 may be a conventional computer, a distributed computer, or any other type of computer, such as one or more external computers made available via a cloud computing architecture. The presently described technology is optionally implemented in software devices loaded in memory 908, stored on a configured DVD/CD-ROM 910 or storage unit 912, and/or communicated via a wired or wireless network link 914, thereby transforming the computer system 900 in FIG. 9 to a special purpose machine for implementing the described operations.

The I/O section 904 is connected to one or more user-interface devices (e.g., a keyboard 916 and a display unit 918), a disc storage unit 912, and a disc drive unit 920. Generally, the disc drive unit 920 is a DVD/CD-ROM drive unit capable of reading the DVD/CD-ROM medium 910, which typically contains programs and data 922. Computer program products containing mechanisms to effectuate the systems and methods in accordance with the presently described technology may reside in the memory section 904, on a disc storage unit 912, on the DVD/CD-ROM medium 910 of the computer system 900, or on external storage devices made available via a cloud computing architecture with such computer program products, including one or more database management products, web server products, application server products, and/or other additional software components. Alternatively, a disc drive unit 920 may be replaced or supplemented by a floppy drive unit, a tape drive unit, or other storage medium drive unit. The network adapter 924 is capable of connecting the computer system 900 to a network via the network link 914, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 900 is connected (by wired connection or wirelessly) to a local network through the network interface or adapter 924, which is one type of communications device. When used in a WAN-networking environment, the computer system 900 typically includes a modem, a network adapter, or any other type of communications device for establishing communications over the wide area network. In a networked environment, program modules depicted relative to the computer system 900 or portions thereof, may be stored in a remote memory storage device. It is appreciated that the network connections shown are examples of communications devices for and other means of establishing a communications link between the computers may be used.

In an example implementation, manifest file subsets and corresponding content segments, a plurality of internal and external databases, source databases, and/or cached data on servers are stored as the memory 908 or other storage systems, such as the disk storage unit 912 or the DVD/CD-ROM medium 910, and/or other external storage devices made available and accessible via a network architecture. Content streaming, distribution, and delivery software and other modules and services may be embodied by instructions stored on such storage systems and executed by the processor 902.

Some or all of the operations described herein may be performed by the processor 902. Further, local computing systems, remote data sources and/or services, and other associated logic represent firmware, hardware, and/or software configured to control operations of the CDN 102, the user devices 104, 414, 416, 604, and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 902 and a user may interact with a Graphical User Interface (GUI) using one or more user-interface devices (e.g., the keyboard 916, the display unit 918, and the user devices 904) with some of the data in use directly coming from online sources and data stores. The system set forth in FIG. 9 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
receiving, at a network component, a request for a manifest subset from a user device, the manifest subset corresponding to a delivery of content over a network to the user device;
detecting, in response to receiving the request for the manifest subset, one or more quality of service parameters associated with the delivery of the content to the user device using the network component, wherein the one or more quality of service parameters includes a bit rate for delivery of the content;
determining, in response to receiving the request for the manifest subset, current network conditions;
modifying, by the network component, at least one of the quality of service parameters dynamically based on the current network conditions, including modifying the bit rate;
providing, by the network component, the manifest subset to the user device, the manifest subset identifying a set of one or more content segments constituting a portion of the content, wherein the manifest subset is specific to the modified bit rate and chosen from a group of manifest subsets of different bit rates; and
delivering the set of one or more content segments in response to separate requests in accordance with the at least one modified quality of service parameter of the network, including the modified bit rate.

2. The method of claim 1, wherein the one or more quality of service parameters includes a network path along which the content is delivered to the user device.

3. The method of claim 2, wherein the network path is modified by rerouting the user device to an optimized network path.

4. The method of claim 1, wherein the one or more quality of service parameters includes formatting parameters of the content for presentation on the user device.

5. The method of claim 1, wherein the one or more quality of service parameters includes processing parameters for transmitting the content over a communications link in the network.

6. The method of claim 1, wherein the one or more quality of service parameters includes delivery parameters for delivering the content to the user device.

7. The method of claim 1, wherein the current network conditions are based on a topology of the network.

8. The method of claim 1, wherein the current network conditions are based on an infrastructure of a content source from which the content is served.

9. The method of claim 1, wherein the current network conditions are based on an attachment point of the user device to the network.

10. A system comprising:
at least one processor;
memory, operatively connected to the at least one processor and containing instructions that, when executed by the at least on processor, cause the system to perform a method, the method comprising:
receiving a request for a manifest subset from a user device, the manifest subset corresponding to a delivery of content over a network to the user device;
detecting, in response to receiving the request for the manifest subset, one or more quality of service parameters associated with the delivery of the content to the user device using a network component, wherein the one or more quality of service parameters includes a bit rate for delivery of the content;
determining, in response to receiving the request for the manifest subset, current network conditions;
modifying, by the network component, at least one of the quality of service parameters dynamically based on the current network conditions, including modifying the bit rate;
providing, by the network component, the manifest subset to the user device, the manifest subset identifying a set of one or more content segments constituting a portion of the content, wherein the manifest subset is specific to the modified bit rate and chosen from a group of manifest subsets of different bit rates; and
delivering the set of one or more content segments in response to separate requests in accordance with the at least one modified quality of service parameter of the network, including the modified bit rate.

11. The system of claim 10, wherein the one or more quality of service parameters includes a network path along which the content is delivered to the user device.

12. The system of claim 11, wherein the network path is modified by rerouting the user device to an optimized network path.

13. The system of claim 10, wherein the one or more quality of service parameters includes formatting parameters of the content for presentation on the user device.

14. The system of claim 10, wherein the one or more quality of service parameters includes processing parameters for transmitting the content over a communications link in the network.

15. The system of claim 10, wherein the one or more quality of service parameters includes delivery parameters for delivering the content to the user device.

16. The system of claim 10, wherein the current network conditions are based on a topology of the network.

17. The system of claim 10, wherein the current network conditions are based on an infrastructure of a content source from which the content is served.

18. The system of claim 10, wherein the current network conditions are based on an attachment point of the user device to the network.

19. A nontransitory computer readable storage medium storing instructions that, when executed by at least one processor, cause the at least one processor to perform a method, the method comprising:
receiving, at a network component, a request for a manifest subset from a user device, the manifest subset corresponding to a delivery of content over a network to the user device;
detecting, in response to receiving the request for the manifest subset, one or more quality of service parameters associated with the delivery of the content to the user device using the network component, wherein the one or more quality of service parameters includes a bit rate for delivery of the content;
determining, in response to receiving the request for the manifest subset current network conditions;
modifying, by the network component, at least one of the quality of service parameters dynamically based on the current network conditions, including modifying the bit rate;
providing, by the network component, the manifest subset to the user device, the manifest subset identifying a set of one or more content segments constituting a portion of the content, wherein the manifest subset is specific to the modified bit rate and chosen from a group of manifest subsets of different bit rates; and delivering the set of one or more content segments in response to separate requests in accordance with the at least one modified quality of service parameter of the network, including the modified bit rate.

20. The nontransitory computer readable storage medium of claim 19, wherein the one or more quality of service parameters includes formatting parameters of the content for presentation on the user device.

\* \* \* \* \*